No. 790,850. PATENTED MAY 23, 1905.
A. PFEIFFER & K. HEIN.
MEANS FOR SUSPENDING THE SUPPORTING RODS OF GEODETIC OR SIMILAR INSTRUMENTS.
APPLICATION FILED NOV. 9, 1903.
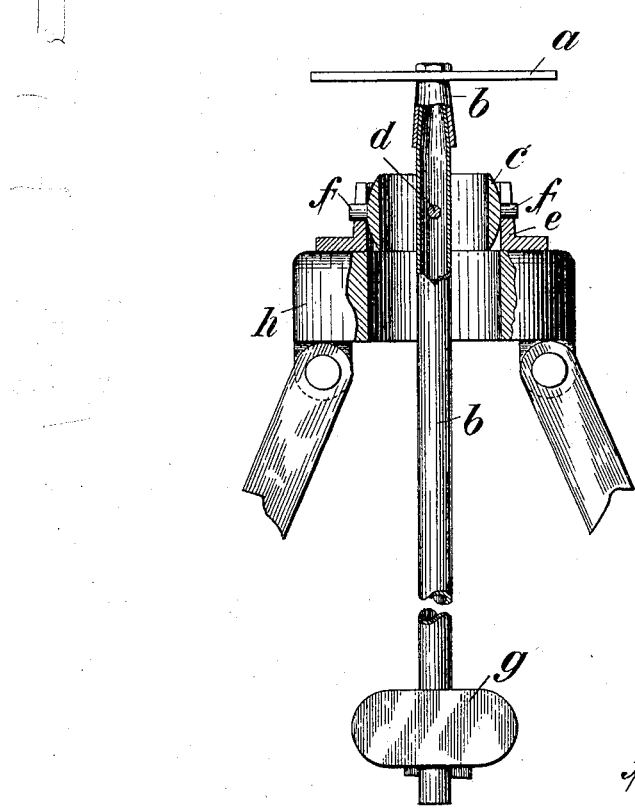
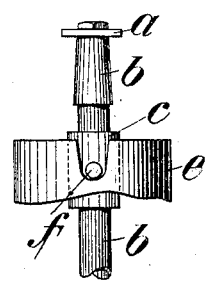
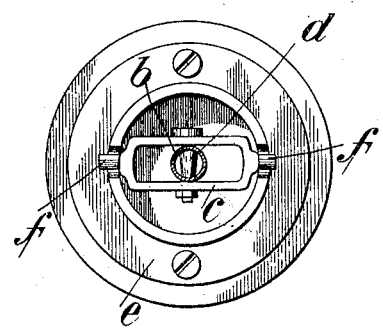
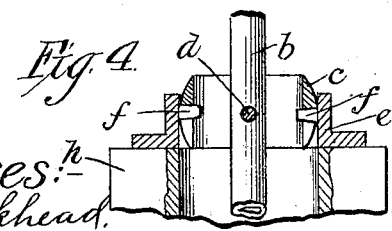
Witnesses:
P. H. Buckhead.
A. C. Powell.
Inventors,
Karl Hein and Adolf Pfeiffer
by their Attorneys,
Howson & Howson No. 790,850. Patented May 23, 1905.

UNITED STATES PATENT OFFICE.

ADOLF PFEIFFER AND KARL HEIN, OF HANOVER, GERMANY; SAID PFEIFFER ASSIGNOR TO SAID HEIN.

MEANS FOR SUSPENDING THE SUPPORTING-RODS OF GEODETIC OR SIMILAR INSTRUMENTS.

SPECIFICATION forming part of Letters Patent No. 790,850, dated May 23, 1905.

Application filed November 9, 1903. Serial No. 180,439.

*To all whom it may concern:*

Be it known that we, ADOLF PFEIFFER and KARL HEIN, subjects of the German Emperor, residing in Hanover, in the Empire of Germany, have invented Means for Suspending the Supporting-Rods of Geodetic or Similar Instruments, of which the following is a specification.

While the Cardanic suspension may be used for the vertical adjustment of the supporting-rod of geodetic and similar instruments, it entirely fails to secure a quick and accurate adjustment of the rod or to maintain it in its adjusted position. For this reason the Cardanic suspension is useless for many purposes—for instance, for maintaining horizontal a geodetic instrument or other apparatus in which it is not only important to quickly secure an exact horizontal position, but also to secure a continued vertical adjustment of the supporting-rod and continued horizontal position of the instruments connected with it after such position is obtained. For these reasons geodetic instruments with suspension contrivances in which the supporting-rod swings in all directions are not in use, and those in which it swings only in a plane are very little in use.

The object of the present invention is to construct a simple suspension-joint consisting of few parts, in which the supporting-rod will come comparatively quickly to rest and stay in such position under normal conditions. Such a joint may, for example, consist of a frame movable in one plane hung on two cylindrical pins in a bearing, the supporting-rod of the instrument being similarly hung within the frame, so as to swing at right angles to the frame. By guiding the swinging parts by a peculiar bearing for the movable axis and by mounting the hollow supporting-rod on a conical shaft we not only cause the supporting-rod to come comparatively quickly to rest and prevent it from leaving that position under normal conditions, but we also secure a uniform working of the joint and the supporting-rod suspended in the same and secure and maintain the vertical position of the supporting-rod even with an obliquely-placed tripod.

In the drawings, Figure 1 shows a longitudinal section through a universal joint. Fig. 2 is a front view. Fig. 3 is a plan view, and Fig. 4 is a view of a modification.

The rule $a$ rests on the supporting-rod $b$, which swings on the horizontal shaft $d$, secured in the frame $c$. This supporting-rod for the purpose of taking apart and for easy transportation may advantageously be composed of two parts. The second axis of oscillation is at right angles to the shaft $d$ and is formed by the pins $f$ of the frame $c$, resting in the bearings $e$, so that the supporting-rod $b$ is movable after the manner of the universal joint and is brought automatically into the perpendicular by means of the pendulum-weight $g$, so that the rule $a$, even with an oblique position of the tripod $h$, is given a horizontal position, which is controlled through the pendulum $g$ and rod $b$. In order that the joint may come quickly to rest, however, and that it may not, like the hitherto known Cardanic suspensions, remain a long time in oscillatory motion and also be liable to be set in motion again by even slight concussions, we so construct the frame $c$, Fig. 1, to fit snugly into the bearing $e$ in such manner that on the coming of the level to rest as much friction ensues as is consistent with the sensitiveness of the instrument. This friction, however, is not so considerable that it interferes with the nicety of the adjustment. Similarly the supporting-rod $b$ is guided snugly in the walls of the frame $c$, Fig. 3. Besides this arrangement (or in place of the same) the bearing-notches, Fig. 2, for the pivot-pins $f$ in the bearings $e$ are made somewhat larger than the diameter of these pins $f$, which in their motion have the tendency to roll in the larger bearing-notches; but this tendency of the pins is counteracted by the weight resting on the pins, which during the rolling of the pins would have to be raised on the ascending course of the bearing-notches. It is obvious that the pins need not be connected with the frame, but that the frame may swing on pins which are solidly connected with the bearing-disk. In this case there would have to be bearing-notches in the frame, the diameter of which bearing-notches would be somewhat larger than the diameter of the pins supporting the frame, Fig. 4.

The shaft $d$ is shaped conically, Fig. 3, and fitted accurately into the hollow supporting-rod $b$ in such manner that this shaft $d$ on possible wearing can be readjusted. This conical form of the shaft $d$ prevents the slight play of the supporting-rod $b$ around the shaft $d$, which would otherwise prevent quick adjustment.

The pendulum-weight $g$ may of course be done away with, and in place of this the instrument itself may be constructed with its center of gravity below the suspension contrivance, so that it represents a pendulum-weight, as it were, and effects the automatic adjustment in the before-described manner.

We claim as our invention

1. The herein-described Cardanic support for geodetic instruments, comprising a supporting-rod, a frame, a tripod, bearings and cylindrical pins therefor of less diameter than the bearings between the frame and tripod, and bearings and pin at right angles to aforesaid pins between the supporting-rod and frame.

2. The herein-described Cardanic support for geodetic instruments, comprising a supporting-rod, a frame, a tripod, bearings and cylindrical pins therefor of less diameter than the bearings between the frame and tripod, and a conical pin in said frame at right angles to the aforesaid pins on which the supporting-rod is hung.

In testimony whereof we have signed our names to this specification in the presence of two subscribing witnesses.

ADOLF PFEIFFER.
KARL HEIN.

Witnesses:
H. HALL HALL,
ANNA DIPPEL.